United States Patent
Paterour

(10) Patent No.: US 11,985,172 B2
(45) Date of Patent: May 14, 2024

(54) COMMUNICATION NETWORK AND METHOD OF DECENTRALISED MANAGEMENT OF COMMUNICATIONS VIA THE COMMUNICATION NETWORK

(71) Applicant: AIRBUS DS SLC, Elancourt (FR)

(72) Inventor: Olivier Paterour, Guyancourt (FR)

(73) Assignee: AIRBUS DS SLC, Elancourt (FR)

(*) Notice: Subject to any disclaimer, the term of this patent is extended or adjusted under 35 U.S.C. 154(b) by 268 days.

(21) Appl. No.: 16/861,629

(22) Filed: Apr. 29, 2020

(65) Prior Publication Data

US 2020/0344275 A1 Oct. 29, 2020

(30) Foreign Application Priority Data

Apr. 29, 2019 (FR) ...................................... 1904514

(51) Int. Cl.
| | |
|---|---|
| *H04L 65/1016* | (2022.01) |
| *H04L 65/1069* | (2022.01) |
| *H04L 65/1073* | (2022.01) |
| *H04L 65/1104* | (2022.01) |
| *H04W 72/30* | (2023.01) |

(52) U.S. Cl.
CPC ...... *H04L 65/1016* (2013.01); *H04L 65/1069* (2013.01); *H04L 65/1073* (2013.01); *H04L 65/1104* (2022.05); *H04W 72/30* (2023.01)

(58) Field of Classification Search
CPC . H04L 63/08; H04L 65/1006; H04L 65/1016; H04L 65/1069; H04L 65/1073; H04L 65/4076; H04W 4/06; H04W 4/08; H04W 4/20; H04W 72/005
See application file for complete search history.

(56) References Cited

U.S. PATENT DOCUMENTS

| | | | |
|---|---|---|---|
| 2001/0016492 A1* | 8/2001 | Igarashi | H04W 8/20 455/433 |
| 2003/0065947 A1* | 4/2003 | Song | H04L 63/08 726/23 |
| 2014/0329497 A1* | 11/2014 | Sanzgiri | H04L 63/0861 455/26.1 |
| 2016/0196628 A1* | 7/2016 | Crowley | H04L 63/1441 705/325 |
| 2017/0026896 A1* | 1/2017 | Enomoto | H04W 92/18 |

(Continued)

FOREIGN PATENT DOCUMENTS

EP 2 887 620 A1 6/2015

OTHER PUBLICATIONS

French Search Report as issued in French Patent Application No. 1904514, dated Oct. 30, 2019.

(Continued)

*Primary Examiner* — Khaled M Kassim
(74) *Attorney, Agent, or Firm* — Pillsbury Winthrop Shaw Pittman LLP

(57) ABSTRACT

A communication network allowing at least one user device, thanks to configuration information, to access communication services, the communication being a private communication or a communication within a multimedia group with which the user device is affiliated, the communication network including a plurality of servers, wherein the configuration information of the user device is configured in each server to which the user device is authorised to access.

13 Claims, 1 Drawing Sheet

(56) References Cited

U.S. PATENT DOCUMENTS

2018/0027458 A1* 1/2018 Mohan ................ H04W 48/08
                                                       370/331
2019/0222424 A1* 7/2019 Lindemann .......... H04L 9/0861
2020/0067907 A1* 2/2020 Avetisov ............... H04L 9/3218
2021/0044976 A1* 2/2021 Avetisov ............... H04L 63/062

OTHER PUBLICATIONS

Rosenberg, J., et al: "RFC 3261—SIP: Session Initiation Protocol," Jun. 1, 2002 (Jun. 1, 2002), XP055324488, Retrieved from the Internet: URL:https://tools.ietf.org/html/rfc3261, 270 pages.
"Interconnection shat group call," Airbus, 3GPP TSG-SA WG6 Meeting #25, S6-181143, Sep. 2018, XP051561420, Retrieved from the Internet: URL:http://www.3gpp.org/ftp/Meetings%5F3GPP%5FSYNC/SA/Docs/SP%2D180618%2Ezip, 6 pages.

* cited by examiner

[Fig. 1]
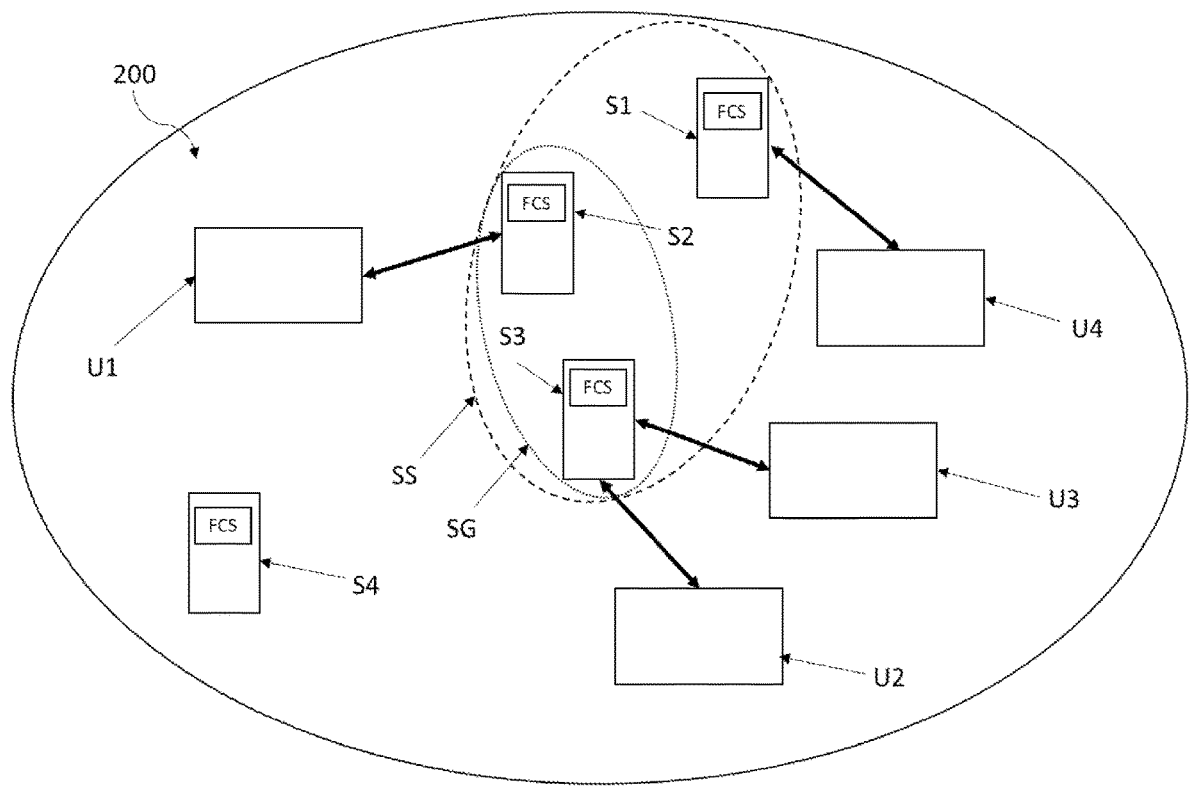
[Fig. 2]
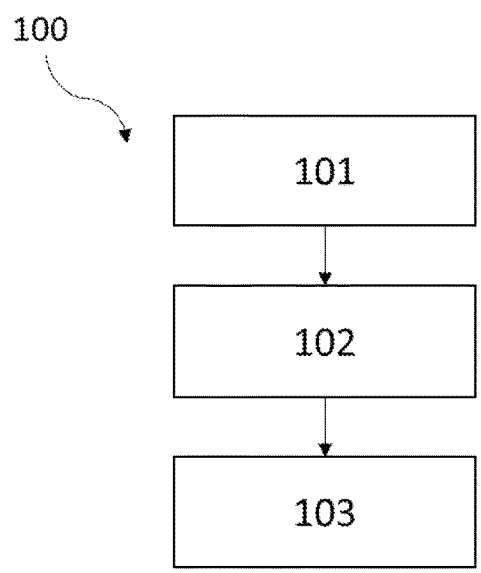

COMMUNICATION NETWORK AND METHOD OF DECENTRALISED MANAGEMENT OF COMMUNICATIONS VIA THE COMMUNICATION NETWORK

CROSS-REFERENCE TO RELATED APPLICATIONS

This application claims priority to French Patent Application No. 1904514, filed Apr. 29, 2019, the entire content of which is incorporated herein by reference in its entirety.

FIELD

The technical field of the invention is that of communication networks and more particularly that of communication networks that allow for decentralised management of communications.

The present invention relates to a communication network and more particularly a communication network allowing for a decentralised management of communications.

BACKGROUND

In the standard 3GPP that governs mobile networks 2G or GSM (for "Global System for Mobile Communications"), 3G, 4G or LTE (for "Long-Term Evolution") and 5G, and more particularly in the services MCS (for "Mission Critical Services") for mobile communications within a tactical network, each user has a user server and at least one group server respectively referred to as "home user server" and "home group server", defined by the configuration, with which it can have access to its user profile and to its multimedia groups allowing it to conduct private communications and group communications.

In the standard 3GPP MCS, these servers are considered as able to be reached by the user, and when this is not the case, the user can possibly register with an isolated local server MCS if such a server has been deployed. However, only the communications with the users registered with this same local server MCS are possible; access to the communication services proposed by the communication network is then considerably limited.

There exists therefore a need for a user to be able to access communication services proposed by a communication network, regardless of the state of the connection with its "home servers" thereof.

SUMMARY

An aspect of the invention offers a solution to the problems mentioned hereinabove, by allowing a user to be able to communicate with other users of a communication network independently of the state of the connection thereof with its "home servers".

A first aspect of the invention relates to a communication network allowing at least one user device, thanks to configuration information, to access communication services, the communication being a private communication or a communication within a multimedia group with which the user device is affiliated, the communication network comprising a plurality of servers and being characterised in that each server to which the user device is authorised to access comprises the configuration information of the user device.

Thanks to the invention, as the configuration information required for the authentication and the registration for access to the communication services by the user is stored in all the servers of the communication network to which the user is authorised to access, it can be authenticated and registered with any of the servers of the communication network and continue to communicate with the other users, as if it were connected to its "home servers". The management of the communications is therefore no longer centralised at the level of the "home servers" but distributed over all the servers of the communication network.

In addition to the characteristics that have just been mentioned in the preceding paragraph, the method according to a first aspect of the invention can have one or several additional characteristics among the following, considered individually or in any technically permissible combinations.

According to an embodiment, a plurality of servers of the communication network share a multicast signalling session.

Thus, each server that shares the signalling session can send a message to all the other servers of the signalling session.

According to an alternative embodiment of the preceding embodiment, the signalling session is configured in each server that shares the signalling session.

According to an alternative embodiment of the preceding embodiment compatible with the preceding alternative embodiment, each server is configured to join the signalling session as soon as a first user device has registered with it.

Thus, a server to which no user device is connected does not receive the messages sent via the signalling session.

According to an alternative embodiment of the preceding embodiment compatible with the preceding alternative embodiments, each server is configured to join the signalling session and send the list of user devices that are registered with it, when the server connects or reconnects to the communication network.

Thus, the server makes known to the other servers the user devices that are connected to it so that the other servers can initiate private communications with these user devices.

According to an alternative embodiment compatible with the preceding alternative embodiment, each other server of the communication network is configured to respond by publishing the list of user devices that are registered with it.

Thus, the server that connects or reconnects to the communication network knows all the users of the communication network and can join them for private communications.

According to an embodiment compatible with the preceding embodiment, each multimedia group comprises a multicast group session shared between the servers with which user devices affiliated with the multimedia group are registered.

Thus, the users of a multimedia group can communicate and exchange data or videos via the group session.

According to an alternative embodiment of the preceding embodiment, each server is configured to join a group session when one of the user devices registered with it is affiliated with the corresponding multimedia group.

Thus, the new user can communicate and exchange data with the other users of the multimedia group with which it has just affiliated.

According to an alternative embodiment of the preceding embodiment compatible with the preceding alternative embodiment, each server is configured to join the group session or sessions with which the user devices that are registered with it are affiliated when said server connects or reconnects to the communication network.

Thus, the users authenticated with the server can communicate and exchange data with the other users of the multimedia group.

According to an embodiment compatible with the preceding embodiments, each server includes a transmission management module.

Thus, each server has a module capable of managing speaking for audio and transmitting for video in a multimedia group.

A second aspect of the invention relates to a method of decentralised management of communications via a communication network comprising a plurality of servers, the method comprising the following steps:

Authenticating and registering a user device with a first server of the communication network;

Sending, by the first server, of a message signalling the authentication and the registration of the user device, to the other servers of the communication network;

Communicating of the user device with at least one other user device authenticated and registered with a server of the communication network, the communication being a private communication or a communication within a multimedia group with which the user device is affiliated.

Thus, once the user device is connected with a server, this one informs all the other servers of this so that the latter can join the user device as part of a private communication.

According to an embodiment, if the user device had already registered with another server of the communication network, the message comprises an identifier of the other server.

Thus, the servers know that the user device can no longer be joined via the other server.

According to an embodiment compatible with the preceding embodiment, the step of sending the message is carried out via the signalling session.

Thus, the message is sent to all the servers of the network with which a user device is registered and the latter can join the user device as part of a private communication.

According to an embodiment compatible with the preceding embodiments, the communication within a multimedia group is carried out via the corresponding group session.

Thus, the user device can communicate and exchange data with the other user devices of the multimedia group.

According to an embodiment compatible with the preceding embodiments, during each multimedia group communication, the management of the transmission is assigned dynamically between the transmission management modules of the servers of the communication network that are sharing the group session.

Thus, at a given instant, the transmission management module which manages speaking for audio and transmitting for video within the multimedia group is the one of the server with which the user who is speaking or transmitting a video is affiliated and the management of the transmissions is thus no longer centralised at the level of the "home servers".

The invention and its different applications shall be better understood when reading the following description and when examining the accompanying figures.

BRIEF DESCRIPTION OF THE FIGURES

The figures are presented for the purposes of information and in no way limit the invention.

FIG. 1 diagrammatically shows a communication network according to a first aspect of the invention.

FIG. 2 shows a block diagram of a method according to a second aspect of the invention.

DETAILED DESCRIPTION

Unless mentioned otherwise, the same element appearing in different figures has a single reference.

A first aspect of the invention relates to a communication network allowing for a decentralised management of communications.

The term "communication network" means a network that allows access to communication services, i.e. to services linked to communication, for example access to voice, to video or to a messaging system with files in order to interact with one or several user devices. The communication services make it possible to establish private communications between two user devices or group communications between the user devices affiliated with the same multimedia group.

The term "multimedia group" means a group that includes several user devices that can interact together once they are authenticated and registered with a server of the communication network allowing for access to the multimedia group.

The term "user device authenticated with a server" means a user device of which the identity has been verified and/or validated by a server during an electronic exchange.

The term "user device registered with a server" means a user device connected to a server therefore that can be joined for private communications via this server. A user device cannot register with a server if it has not been authenticated beforehand with this same server.

The term "decentralised management of communication" is defined in opposition to a "centralised management of communications" which is management carried out in a centralised manner at the level of the home servers of the user device that initiates the communication.

The communication network responds for example to the standard 3GPP MCS, i.e. it is compatible with the standard 3GPP MCS and more particularly with the current version of 3GPP which is version 15, with the preceding versions starting from version 13 and with the following versions that integrate all the characteristics of the invention.

The communication network 200 can be fixed, for example a communication network covering a company, or mobile, i.e. tactical, used, for example, in the case of a mission of special forces.

The communication network according to a first aspect of the invention comprises at least one user device and a plurality of servers.

FIG. 1 diagrammatically shows the communication network 200 according to a first aspect of the invention.

The communication network 200 comprises four user devices U1, U2, U3, U4.

A user device U1, U2, U3, U4 is for example a smartphone, a tablet or a laptop. Generally, the user device U1, U2, U3, U4 has a screen.

The communication network 200 also comprises four servers S1, S2, S3, S4.

Each server S1, S2, S3, S4 is for example compatible with the standard 3GPP MCS with regards to the client-server interface.

A server S1, S2, S3, S4 of the communication network 200 then includes an identity management module IDMS, a configuration management module CMS, a multimedia group management module GMS and an encryption key management module KMS.

The identity management module IDMS is configured to receive and process authentication requests sent by the user devices U1, U2, U3, U4.

The configuration management module CMS is configured to receive a user profile request and to send a user profile to each user device U1, U2, U3, U4 of which the authentication request is accepted by the identity management module IDMS of the server S1, S2, S3, S4.

The multimedia group management module GMS is configured to receive a group multimedia profile request and to send at least one multimedia group profile to each user device U1, U2, U3, U4 of which the authentication request is accepted by the identity management module IDMS of the server S1, S2, S3, S4.

The encryption key management module KMS is configured to receive an encryption key request and to send at least one encryption key to each user device U1, U2, U3, U4 of which the authentication request is accepted by the identity management module IDMS of the server S1, S2, S3, S4. The encryption key or keys received then allow the user device U1, U2, U3, U4 to itself generate its encryption keys for private communications.

A server S1, S2, S3, S4 of the communication network 200 comprises for example a transmission management module FCS (for "Floor Control Server").

The transmission management module FCS of a server S1, S2, S3, S4 is configured to manage, in a decentralised manner, the managing of speaking during an audio communication within a multimedia group with which user devices U1, U2, U3, U4 are affiliated registered with the server S1, S2, S3, S4 and the management of transmitting during a video communication. The transmission management module FCS does not manage the messaging system services with file exchange.

In the communication network 200 shown in FIG. 1, the user device U4 is registered with the server S1, the user device U1 is registered with the server S2 and the user devices U2, U3 are registered with the server S3, which is materialised by the solid line two-way arrows between the user device U4 and the server S1, between the user device U1 and the server S2, the user device U2 and the server S3 and the user device U3 and the server S3.

No user device U1, U2, U3, U4 is registered with the server S4.

In the communication network 200 according to a first aspect of the invention, the configuration information required for the authentication and the registration for access to the communication services by a user device U1, U2, U3, U4 is duplicated in each server S1, S2, S3, S4 of the communication network 200 to which said user device U1, U2, U3, U4 is authorised to access.

Thus, in FIG. 1, in the hypothesis where the user devices U1, U2, U3, U4 have access to all the servers S1, S2, S3, S4 of the communication network 200, the configuration information of the user devices U1, U2, U3, U4 is configured in each one of the servers S1, S2, S3, S4 of the communication network 200.

Each user device U1, U2, U3, U4 can therefore be authenticated and be registered with any of the servers S1, S2, S3, S4 of the communication network 200. Therefore there are no longer any "home servers" per se, as each server S1, S2, S3, S4 plays the role of "home server" if the user device U1, U2, U3, U4 is registered with it.

In the case where the servers S1, S2, S3, S4 are servers MCS, the configuration information is for example the identifier, the user profile, the multimedia group profile or profiles and the encryption key or keys.

The identifier is then stored in the identity management module IDMS, the user profile in the configuration management module CMS, the multimedia group profile or profiles in the multimedia group management module GMS and the encryption key or keys in the encryption key management module KMS of each one of the servers S1, S2, S3, S4 to which the user device U1, U2, U3, U4 is authorised to access.

A second aspect of the invention relates to a method of decentralised management of communications via the communication network 200 according to a first aspect of the invention.

FIG. 2 shows a block diagram of the method 100 according to a first aspect of the invention.

The first step 101 of the method 100 consists of authenticating and registering a user device U1, U2, U3, U4 with a server S1, S2, S3, S4 of the communication network 200, called first server.

The first server S1, S2, S3, S4 uses for example a standard protocol for the authentication, such as for example the protocol OpenIDConnect developed in the standard 3GPP MCS.

According to this protocol, the first step 101 of authenticating comprises a first sub-step consisting of the sending, by the user device U1, U2, U3, U4, of an authentication request to the identity management module IDMS of the first server S1, S2, S3, S4.

The authentication request is then processed by the identity management module IDMS of the first server S1, S2, S3, S4 during a second sub-step of processing.

This second sub-step of processing itself comprises several sub-steps:
- a first sub-step of receiving the authentication request sent by the user device U1, U2, U3, U4 by the identity management module IDMS;
- a second sub-step of sending a request of at least one authentication information to the user of the user device U1, U2, U3, U4 by the identity management module IDMS and of receiving the request by the user device U1, U2, U3, U4;
- a third sub-step of supplying the authentication information requested by the user by using the user device U1, U2, U3, U4;
- a fourth sub-step of sending the authentication information supplied by the user to the identity management module IDMS and of receiving the authentication information by the identity management module IDMS;
- a fifth sub-step of browsing a user database BDD of the first server S1, S2, S3, S4 by the identity management module IDMS in order to determine whether or not the user database BDD contains the authentication information.

At the end of the fifth sub-step of the second sub-step of processing, if the identity management module IDMS did not find the authentication information, the authentication request is rejected. On the contrary, if the identity management module IDMS has found the authentication information, the authentication request is accepted.

The authentication information is for example a password and/or a username and/or a biometric data.

The user database BDD is for example a base of identifiers that relates the authentication information with a corresponding identifier.

In the case where the authentication request is accepted, the identifier that corresponds to the authentication information of the user 302 is sent to the user device U1, U2, U3, U4.

During a second sub-step of the first step 101 of the method 100, the identifier is used to obtain a user profile. Indeed, the user device U1, U2, U3, U4 sends a user profile request to the configuration management module CMS of the first server S1, S2, S3, S4, with the user profile request comprising the identifier. The user device U1, U2, U3, U4 then receives in return the user profile that corresponds to the identifier.

The user profile may comprise a list of multimedia group identifiers that correspond to the multimedia groups to which the user profile thereof gives it access.

During a third sub-step of the first step 101 of the method 100, the user device U1, U2, U3, U4 sends a group multimedia profile request to the multimedia group management module GMS of the first server S1, S2, S3, S4, with the group multimedia profile request comprising the identifier. The user device U1, U2, U3, U4 then receives in return the multimedia group profile associated with each multimedia group identifier of the list of multimedia group identifiers.

During a fourth sub-step of the first step 101 of the method 100, the user device U1, U2, U3, U4 sends an encryption key request to the encryption key management module KMS of the first server S1, S2, S3, S4, with the encryption key request comprising the identifier. The user device U1, U2, U3, U4 then receives in return at least one encryption key.

Once the user device U1, U2, U3, U4 has received the user profile, the multimedia group profile or profiles, the encryption key or keys, the user device U1, U2, U3, U4 has all the configuration elements that allow it to access the communication services proposed by each multimedia group for which it has obtained the profile and to the private communication services.

The first server S1, S2, S3, S4 uses for example a standard protocol for the registration, such as for example the protocol SIP (for "Session Initiation Protocol"), consisting in sending by the user device U1, U2, U3, U4 of a message SIP comprising an identifier retrieved from the identity management module IDMS during the authentication.

A second step 102 of the method 100 consists in the sending, by the first server S1, S2, S3, S4, of a message that informs that the user device U1, U2, U3, U4 has been authenticated and registered with it, to the other servers S1, S2, S3, S4 of the communication network 200.

The message may comprise an identifier of another server S1, S2, S3, S4 of the communication network 200 if the user device U1, U2, U3, U4 had already registered with this other server S1, S2, S3, S4 before trying to register with the first server S1, S2, S3, S4.

According to an embodiment, the message is sent via a multicast signalling session shared between several servers S1, S2, S3, S4 of the communication network 200.

The term "signalling session" means a session that is usually used for exchanging service messages between the servers of a network or between the latter and the user devices connected to the network, which are required for establishing and managing communications.

The term "multicast session" means a session wherein data is broadcast from an emitter to at least one receiver.

The signalling session is for example defined by configuration in the servers S1, S2, S3, S4 of the communication network 200.

For example, in FIG. 1, the servers S1, S2 and S3 share a signalling session SS.

Thus, the information from the user device U1 was sent to the servers S1 and S3 after the registration thereof via the signalling session SS.

For example, a server S1, S2, S3, S4 of the communication network 200 joins the signalling session SS if a first user device U1, U2, U3, U4 registers with it.

Thus, in FIG. 1, no user device U1, U2, U3, U4 has ever registered with the server S4 which does not belong to the signalling session SS.

For example, when a new server joins the communication network 200 or when a server S1, S2, S3, S4 of the communication network 200 loses the connection to the communication network 200 then reconnects to the communication network 200, the server joins the signalling session and sends in multicast a list containing the user devices U1, U2, U3, U4 that are registered with it. The other servers S1, S2, S3, S4 of the communication network 200 respond by also sending the list of user devices U1, U2, U3, U4 that are registered with each one of them.

Thus, each server S1, S2, S3, S4 of the communication network 200 is informed of the presence of each registered user device U1, U2, U3, U4 and can initiate communication with each registered user device U1, U2, U3, U4.

A third step 103 of the method 100 consists, for the user device U1, U2, U3, U4 of communicating with another user device U1, U2, U3, U4 registered with a server S1, S2, S3, S4 of the communication network 200 during a private communication or of communicating with a plurality of user devices U1, U2, U3, U4 each registered with a server S1, S2, S3, S4 of the communication network 200 during a communication within a multimedia group with which the user device U1, U2, U3, U4 is affiliated.

Each multimedia group with which a user device U1, U2, U3, U4 is affiliated proposes group communication services, allowing the user device U1, U2, U3, U4 to communicate with the other user devices U1, U2, U3, U4 affiliated with the multimedia group.

For this, each multimedia group comprises a multicast group session SG shared between the servers S1, S2, S3, S4 of the communication network 200 with which the user device U1, U2, U3, U4 affiliated with the multimedia group is registered.

In FIG. 1, the servers S2 and S3 share a multicast group session SG, which makes it possible for example for the user devices U1, U2 and U3 to communicate within the multimedia group.

For example, in the case where a user device U1, U2, U3 wishes to send a file to the other devices U1, U2, U3 of the multimedia group, the file being stored in the server S2, S3 with which the user device U1, U2, U3 sending the file is registered, the group session SG is used to store the link to this file in each server S2, S3 so that each user device U1, U2, U3 affiliated with the multimedia group can have access to the file even if the server S2, S3 to which the user device U1, U2, U3 is connected loses its connection with the communication network 200.

For example, when a user device U1, U2, U3, U4 is affiliated with a multimedia group, the server S1, S2, S3, S4 with which it is affiliated joins the group session SG corresponding to said multimedia group.

For example, when a new server joins the communication network 200 or when a server S1, S2, S3, S4 of the communication network 200 loses the connection to the communication network 200 then reconnects to the communication network 200, the server joins the group session or sessions corresponding to one or several multimedia groups with which the user devices U1, U2, U3, U4 registered with said server S1, S2, S3, S4 are affiliated.

The audio communications within a multimedia group are for example of the "Push-To-Talk" (PTT) type and during each multimedia group communication, the speaking is managed by the transmission management module FCS of a server S2, S3 of the communication network 200 that are sharing the group session SG of the multimedia group. Likewise, during each multimedia group video communication, transmitting is managed by the transmission management module FCS.

The management of speaking or of transmitting within the multimedia group is dynamically assigned between the transmission management modules FCS of the servers S2, S3 of the communication network 200 that are sharing the group session SG of the multimedia group. Thus, the transmission management module FCS managing the speaking or managing the transmitting of a communication within a multimedia group is in general not the same at each instant of the communication.

For example, if the user device U1 initiates an audio communication, it is the transmission management module FCS of the server S2 with which the user device U1 is registered that initially manages the speaking. If the user device U2 then wishes to speak and the user device U1 is in the process of communication, the server S3 with which the user device U2 is registered asks the server S2 to speak. If a priority greater than that of the user device U1 is assigned to the user device U2, the server S2 gives the speech to the user device U2 and the transmission management module FCS of the server S3 becomes in charge of the management of speaking. Otherwise, the user device U1 retains the speaking.

If the user device U1 is not in the process of communication, the group session SG broadcasts a message informing that the speaking is free. The user device U2 can then speak and the speaking module FCS of the server S3 becomes in charge of managing the speaking.

If several user devices U2, U3 ask to speak at the same time, the server S2 of which the transmission management module FCS is in charge of transmission management grants the speech to the user device U2, U3 to which the highest priority is assigned. If the user devices U2, U3 have the same priority, the server S2 grants the speech to the user device U2, U3 from which it received the request first.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A communication network allowing at least one user device, based on configuration information, to access communication services, the configuration information including authentication and registration information associated with the user enabling the user device to access the communication services, the communication being a private communication or a communication within a multimedia group with which the user device is affiliated, the communication network comprising a plurality of servers to which the user device is authorised to access, wherein each server of the plurality of servers to which the user device is authorised to access comprises the configuration information of the user device, the authentication and registration information associated with each user being stored beforehand in each server of the plurality of servers to which the user device is authorized to access to enable each user device to connect with any of the plurality of the servers to access the communication services, and wherein at least two servers of the plurality of servers to which the user device is authorized to access share a multicast signalling session, wherein the communication network comprises a third server that is configured to join the multicast signalling session of the at least two servers of the plurality of servers to which the user device is authorized to access and to send to each of the least two servers of the multicast signalling session the list of user devices that are registered with said third server when said third server joins the multicast signalling session, wherein the communication services accessed by the user device include mission critical services.

2. The communication network according to claim 1, wherein the signalling session is configured in each server that shares the signalling session.

3. The communication network according to claim 1, wherein each server is configured to join the signalling session as soon as a first user device has registered with it.

4. The communication network according to claim 1, wherein, each other server of the communication network is configured to respond by publishing the list of user devices that are registered with it.

5. The communication network according to claim 1, wherein each multimedia group comprises a multicast group session shared between the servers with which the user devices affiliated with the multimedia group are registered.

6. The communication network according to claim 5, wherein each server is configured to join a group session when one of the user devices registered with it is affiliated with the corresponding multimedia group.

7. The communication network according to claim 5, wherein each server is configured to join the group session or sessions with which the user devices that are registered with it are affiliated, when said server connects or reconnects to the communication network.

8. The communication network according to claim 5, wherein each server comprises a transmission management module.

9. A method of decentralised management of communications via the communication network according to claim 1, the method comprising:
   a. authenticating and registering a user device with a first server among the plurality of servers of the communication network;
   b. sending, by the first server, of a message signalling the authentication and the registration of the user device, to the other servers of the communication network;
   c. communicating of the user device with at least one other user device authenticated and registered with a server of the plurality of servers of the communication network, the communication being a private communication or a communication within a multimedia group with which the user device is affiliated.

10. The method according to claim 9, wherein when the user device had already registered with another server of the plurality of servers, the message comprises an identifier of the other server.

11. The method according to claim 9 via the communication network of which at least two servers share a multicast signalling session, wherein the sending of the message is carried out via the signalling session.

12. The method according to claim 9 via the communication network of which each multimedia group comprises a multicast group session shared between the servers with which user devices affiliated with the multimedia group are registered, wherein the communication within a multimedia group is carried out via the corresponding group session.

13. The method according to claim 9 via the communication network of which each server comprises a transmission management module and of which each multimedia group comprises a multicast group session shared between the servers with which user devices affiliated with the multimedia group are registered, wherein, during each multimedia group communication, the management of the transmission is assigned dynamically between the transmission management modules of the servers of the plurality of servers that are sharing the group session.

* * * * *